(12) United States Patent
Diebolt et al.

(10) Patent No.: US 7,142,887 B2
(45) Date of Patent: Nov. 28, 2006

(54) PROCESS COMMAND TRANSFER FROM A WIRELESS TELECOMMUNICATIONS DEVICE TOWARD A NEARBY TERMINAL

(75) Inventors: Frank Diebolt, Illkirch (FR); Jean-Philippe Marchand, Fegersheim (FR); Cédric Simon, Illkirch (FR); Sébastien Villars, Illkirch (FR)

(73) Assignee: Alcatel, Paris (FR)

( * ) Notice: Subject to any disclaimer, the term of this patent is extended or adjusted under 35 U.S.C. 154(b) by 917 days.

(21) Appl. No.: 09/875,890

(22) Filed: Jun. 8, 2001

(65) Prior Publication Data

US 2002/0006811 A1 Jan. 17, 2002

(30) Foreign Application Priority Data

Jun. 9, 2000 (EP) .................... 00440169

(51) Int. Cl.
H04B 1/38 (2006.01)
H04M 1/00 (2006.01)
H04M 3/00 (2006.01)

(52) U.S. Cl. ..................... 455/557; 455/418
(58) Field of Classification Search ................ 455/445, 455/41.2, 459–464, 517–520, 557, 418–420; 709/223
See application file for complete search history.

(56) References Cited

U.S. PATENT DOCUMENTS 5,933,478 A    8/1999  Ozaki et al.
6,195,545 B1*  2/2001  Baker et al. .......... 455/414.1
6,230,024 B1*  5/2001  Wang et al. ............ 455/557
6,366,698 B1*  4/2002  Yamakita .............. 382/187
6,553,240 B1*  4/2003  Dervarics .............. 455/566
6,925,303 B1*  8/2005  Mohebbi et al. ........ 455/442

FOREIGN PATENT DOCUMENTS

GB        2329302      *  3/1999
WO     WO 97/37500       10/1997
WO     WO 98/47295       10/1998

* cited by examiner

Primary Examiner—Benny Q. Tieu
(74) Attorney, Agent, or Firm—Sughrue Mion, PLLC

(57) ABSTRACT

An automatic transfer of a process command activated by a user on his wireless telecommunications device in a cell of a cellular telecommunications system toward a terminal nearby in the same cell. This transfer transits via a PBX which administers all the base stations of the cellular telecommunications system and which is connected to a network comprising the terminals. The PBX will forward that process command with the supplementary information telling in which cell of the cellular telecommunications system this process command was received. With that information, a computer which administers all the terminals of the network transfers that process command to a terminal located in the same cell as the wireless telecommunications device at the time that the process command was generated on it and on which this process command will be performed.

8 Claims, 1 Drawing Sheet

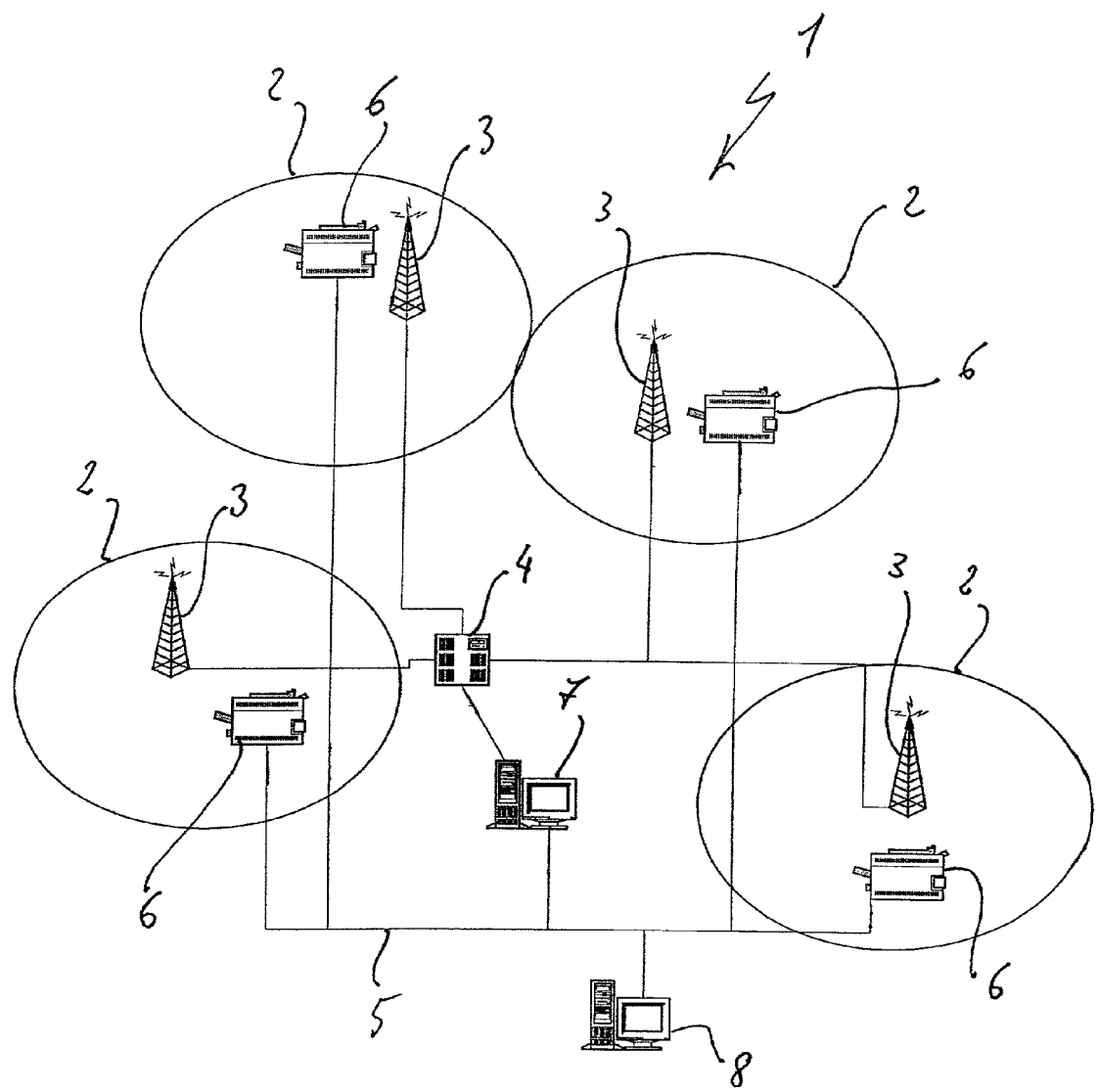
Figure

PROCESS COMMAND TRANSFER FROM A WIRELESS TELECOMMUNICATIONS DEVICE TOWARD A NEARBY TERMINAL

The present invention relates to a method for transferring a process command from a wireless telecommunications device toward some terminal, a wireless telecommunications device and a computer for carrying out this method.

The nowadays never to stop increasing popularity of wireless telecommunications devices ends up that such devices are also used even in an environment where other fixed telecommunications devices are available nearby. Usually, in an enterprise, such fixed telecommunications devices are connected between each other through a private branch exchange PBX. Parallel to that, a data network like a local area network LAN made of a plurality of terminals like personal computers or printers is also present. In fact, a common arrangement is such that at least a majority of the user of the enterprise have access to a telecommunications device and a personal computer both in their office.

An interconnection between the data network and the fixed telecommunications devices via the PBX exits already. It is achieved by some software called integrated or universal messaging system depending f a single or several server like computers administer that network. Such messaging system has an access to all or part of the stored data like email. Therefore, when such software is running on some server like computer having an access to both the data network and the PBX, a user will be able to obtain any information concerning all incoming messages destined to him from any computer of that data network. These incoming messages can be as diverse as emails, fax, voice call or any other kind of messages. For example, not only information concerning the caller of the voice call but the message itself could be displayed on the monitor of the computer in case a voice recognition is available. Therefore, based on user preferences and/or hardware configuration, the computer on which the user logged on, will either play a voice message via multimedia hardware, or stream the message via the server to the PBX for being playback over the telecommunications device affected to that computer.

With such integrated messaging system, a user will be able to obtain those information from any computer letting him entering on his personal account i.e. recognizing his corresponding password. This allows rather a high flexibility for the user in any enterprise offering such kind of integrated messaging system.

Increasingly, it can be found in modern enterprise on top of that the possibility to use an in house cellular telecommunications system. in that case; all base stations spread over the enterprise (Bluetooth, GSM, GPRS, UMTS, DECT . . . ) will be connected to a PBX of that enterprise. Wireless telecommunications devices in that area will be interconnected via the PBX to fixed telephones or even if supporting wireless application protocol WAP to any computer of a data network related to that PBX. A user will therefore not only be able to dial a fixed telephone inside the enterprise but even obtaining an access to his personal account on that data network. In such a way, it will then also be possible to transfer some process command from a wireless telecommunications device to a specific terminal like a computer or a printer connected to that data network.

But to perform such task, the user will have to chose himself the specific terminal according to some conditions like closeness or availability, in a kind of phone book using a telephony user interface TUI. This solution suffers of big limitations. Indeed, it will not be very useful to offer a complete list of all possible devices like printers connected to the data network. In any medium size enterprise, such number is already so high that any user will simply be lost when scrolling on some menu on his TUI to find the correct printer on which he wants e.g. to activate a print from his wireless telecommunications device. A solution could be to restrict the number of devices accessible via a wireless telecommunications device. But this could have the big drawback not to cover, in a satisfied way, all sites of the enterprise. And the awkward situation could happen that someone near a printer couldn't use it from his wireless telecommunications device while not listed on his TUI.

It is an object of the present invention to facilitate the transferring of a process command from a wireless telecommunications device to some terminal nearby without the need for the user of said wireless telecommunications device to know any specific characteristics related, among other, to the location of said terminal.

This object is attained by a transferring method for process command from a wireless telecommunications device toward a terminal as claimed in claim 1, a wireless telecommunications device and a computer as claimed respectively in claim 8 and 9.

It is taken advantage of the possibility to locate a wireless telecommunications device when being active inside a cellular telecommunications system i.e. in which cell it can just be found. Moreover, to each different cell covered each one by a base station is affected a certain number of specific terminals. The present invention is then based on an automatic transferring of a process command activated by an user on his wireless telecommunications device toward one of those terminals in this same cell. This transfer transits via a PBX which administers all the base stations of that cellular telecommunications system and which is connected possibly via a computer to a network made of those terminals. The PBX will forward that process command with the supplementary information telling in which cell of the cellular telecommunications system this process command was received.

With that information, the computer which administers all the terminals of the network, will be able to transfer that process command to a terminal located in the same cell as the wireless telecommunications device at the time that process command was generated on it.

In such a way, the present invention advantageously provides a user of the possibility to print nearby some message like an email or a fax out of his wireless telecommunications device on a terminal being a printer or a monitor of a computer, without imposing him to know any characteristics of the location of that terminal. All the routing to that nearby terminal is performed automatically. No need to perform any update when the user moves to another cell since the terminal to which the generated process command will be sent, is each time newly defined after the process command is received by the corresponding base station covering the cell where it was generated.

Further advantageous features of the invention are defined in the dependent claims and will become apparent from the following description and the drawing.

One embodiment of the invention will now be explained in more detail with reference to the accompanying drawing, in which:

The FIGURE is a schematic view of a cellular telecommunications system allowing transfer of process command according to the invention.

On the FIGURE is shown a cellular telecommunications system 1 typically of an enterprise, which is usually made of a certain number of cells 2, each one covered by a base station 3. They are 4 of that cells on the one shown on the figure. All base stations 3 of that cellular telecommunications system 1 are related to a PBX 4. Not shown here is the common situation that the PBX is also connected to any kind of fixed telecommunications devices spread of the enterprise like plain old telephone or digital ones. The PBX manages among other, any incoming call from outside the enterprise and destined to some telecommunications device connected to that PBX 4.

Parallel to that cellular telecommunications system 1 is also present a data network 5. It connects a certain number of terminals, here in the shown figure printers 6 but it could be also fax or computers with a monitor. That data network 5 is build up in such a way, that at least one of that terminals can be found in each cell 2. The data network 5 often called a local area network LAN is administered by a server like computer 8.

The key point of the present invention is the interconnection between the data network 5 and the PBX 4. In the shown figure, that interconnection is performed via a supplementary server like computer 7. But that server 7 could also be part of the PBX 4 or of the server like computer 8 of the data network. It is this interconnection which will permit to activate a terminal of the network 5 using any wireless telecommunications devices like a DECT or a GSM corporate in one of the cells 2. As shown on the figure, it must be provided that in each cell 2 covered by a base station 3 connected to the PBX 4, is present at least one terminal here a printer 6 being part of the data network 5.

A user will then have a possibility to generate a process command on his wireless telecommunications device to be transferred toward a terminal nearby. Such process command could be rather diverse like a print or a view command of some message (email, fax) respectively on a printer or a monitor connected to the data network 5. That process command will contain only the information of which command must be performed on which data but not on which terminal. This process command will then be transmitted via radio from the wireless telecommunications device toward a base station 3 covering that cell 2 and be collected by the PBX 4.

The PBX 4 will then forward at least part of that process command including some identification of the base station which received that process command to the server like computer 7. There, could be advantageously present a messaging system software like a unified or integrated one. In that case, it is then inside such software, that some rules will be applied to find the corresponding terminal in the same cell to which will finally be sent at least part of the originally process command. As shown on figure, the situation can be that the result of that search made by the computer 7 is first sent to the server like computer 8 which will then routes it to the correct terminal on the LAN.

At the end, when reaching the correct terminal like the nearby printer 6, said process command will then activate on this terminal a print of the selected data. If this terminal is not in the same office, the user will have then only to ask where is this specific terminal. To help him doing that, one could think of sending back some message on his wireless telecommunications device indicating the location of the printer (name, room . . . ). If a Text to Speech system would be available, this message could even be playback on his wireless telecommunications device.

In the case, the cells 2 cover a quite large area, it could be preferable to affect to each cells several of the same kind of terminals like several printers or monitors. Then, after a similar process command is received by the server like computer 7, a message could be send back to the wireless telecommunications device containing a short list of all nearby available terminals. This option could be used to give some choice between the different terminals. The user would then only have to choose one terminal out of a restricted list, on which at the end the process command will be performed. This could be used also to give a choice between e.g. printing a data on a hard copy out of a printer or simply viewing that data on a screen possibly affected for that and placed near that printer.

Alternately, to each cell 2 could be affected a fixed telephone like terminal (a POT or digital one) connected in this case to a different kind of network. The user of the wireless telecommunications device would have the possibility in the same way as for a print, to generate a process command this time concerning for example an automatic transfer of a call to the nearby fixed telephone. This could be very advantageous in the case, e.g. the battery of the wireless telecommunications devices starts to be to much used up. As before, the user would not need to know any specific characteristics concerning the location of the fixed telephone since being in a cell, this hand over will be automatically performed to that already affected fixed telephone by a computer serving as interconnection between the PBX and that network.

When the user moves to another cell and generates there again a process command of that kind on his wireless telecommunications device, the process command will then be transferred this time to a different terminal i.e. the one affected to that respective cell. This shows how flexible and powerful will be a cellular telecommunications system interconnected to a network of terminals spread in each cells of that system.

The present invention also gives a possibility to use a wireless telecommunications device like a remote control without the drawback to have to aim very precisely at a spot on the terminal where the chosen process command has to be performed like it is the case for an IR connection.

The invention claimed is:

1. A method for transferring a process command from a wireless telecommunications device via a cellular telecommunications system, which comprises at least two cells, each of which is controlled by a base station that recognizes said wireless telecommunications device when active, to a terminal device coupled to a network, wherein at least one terminal device is located within each cell of said cellular communications system, said network is coupled to said cellular telecommunications system through a computer, said method comprising:

generating said process command on said wireless telecommunications device for transfer;

transmitting a radio signal that communicates said process command from said wireless telecommunications device to one of said base stations;

forwarding at least part of said process command from said base station to said computer;

applying rules at said computer to select a terminal device resident in the cell controlled by said base station that received said radio signal, said terminal device located in the same cell as said wireless telecommunications device at the time said process command was generated; and performing at least part of said process command on said terminal device.

2. The method for transferring a process command according to claim 1, wherein, if a plurality of terminal devices are resident in a cell, the selection of said terminal device is performed by a user of said wireless telecommunications device using a list of all terminal devices resident in said cell.

3. The method for transferring a process command according to claim 1, wherein said process command concerns an activation of a print of data accessible via said wireless telecommunications device.

4. The method for transferring a process command according to claim 3, wherein said terminal device is a printer.

5. The method for transferring a process command according to claim 3, wherein said terminal device is a monitor on which is displayed said print.

6. The method for transferring a process command according to claim 1, wherein said process command concerns a transfer of a telecommunications connection to said terminal device.

7. The method for transferring a process command according to claim 6, wherein said terminal device is at least in part a telephone.

8. A wireless telecommunications device that accesses a cellular telecommunications system, said wireless telecommunications device comprising a programming code generating a process command to be transferred from said wireless telecommunications device to said terminal devices following the method according to claim 1.

* * * * *